US010617986B2

(12) United States Patent
Fujiwara et al.

(10) Patent No.: US 10,617,986 B2
(45) Date of Patent: Apr. 14, 2020

(54) AIR-PERMEABLE FILTER PROVIDED WITH OIL REPELLENCY (71) Applicant: NITTO DENKO CORPORATION, Osaka (JP)

(72) Inventors: Keiko Fujiwara, Osaka (JP); Yuta Kuroki, Osaka (JP); Hajime Yamamoto, Osaka (JP); Asuka Onohara, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 137 days.

(21) Appl. No.: 15/743,815

(22) PCT Filed: Jul. 25, 2016

(86) PCT No.: PCT/JP2016/003453
§ 371 (c)(1),
(2) Date: Jan. 11, 2018

(87) PCT Pub. No.: WO2017/017948
PCT Pub. Date: Feb. 2, 2017

(65) Prior Publication Data
US 2018/0193787 A1 Jul. 12, 2018

(30) Foreign Application Priority Data
Jul. 27, 2015 (JP) ................................. 2015-147863

(51) Int. Cl.
B01D 53/22 (2006.01)
B01D 46/00 (2006.01)
(Continued)

(52) U.S. Cl.
CPC ..... B01D 46/0027 (2013.01); B01D 39/1661 (2013.01); B01D 39/1692 (2013.01);
(Continued)

(58) Field of Classification Search
CPC ........ B01D 67/0088; B01D 2239/0421; B01D 39/1692; B01D 46/0027; B01D 39/1661; B01D 69/12; B01D 71/36; B01D 69/02
See application file for complete search history.

(56) References Cited

U.S. PATENT DOCUMENTS 3,182,722 A * 5/1965 Reed ...................... E21B 43/04
166/258
4,568,598 A * 2/1986 Bilkadi ................ B05D 3/0446
204/192.36
(Continued)

FOREIGN PATENT DOCUMENTS

JP 4-288349 A 10/1992
JP 5-166546 A 7/1993
(Continued)

OTHER PUBLICATIONS

Banks et al. "Ion Beam Sputter Etching and Deposition of Fluoropolymers" 19 pgs 1978, https://ntrs.nasa.gov/archive/nasa/casi.ntrs.nasa.gov/19780016415.pdf (Year: 1978).*
(Continued)

Primary Examiner — Anthony R Shumate
(74) Attorney, Agent, or Firm — Greenblum & Bernstein, P.L.C.

(57) ABSTRACT

The present invention provides an air-permeable filter capable of maintaining excellent air permeation performance without being clogged even in an environment involving exposure to an oil, oil mist, or ink. The present invention relates to an air-permeable filter including a porous membrane having a surface coated with an oil-repellent agent, the filter being characterized in that a sliding angle of 20 μl of hexadecane or pentadecane on the surface of the filter is 60° or less.

6 Claims, 3 Drawing Sheets (51) Int. Cl.
 B01D 39/16 (2006.01)
 B01D 69/02 (2006.01)
 B01D 67/00 (2006.01)
 B01D 71/36 (2006.01)
 B01D 69/12 (2006.01)

(52) U.S. Cl.
 CPC ......... B01D 67/0088 (2013.01); B01D 69/02 (2013.01); B01D 69/12 (2013.01); B01D 71/36 (2013.01); B01D 2239/0421 (2013.01)

(56) References Cited

U.S. PATENT DOCUMENTS

| | | | | |
|---|---|---|---|---|
| 5,156,780 | A | * | 10/1992 | Kenigsberg ........ B01D 67/0088 210/500.21 |
| 5,284,707 | A | | 2/1994 | Ogawa et al. |
| 5,319,958 | A | * | 6/1994 | Date ..................... G01N 11/00 73/53.01 |
| 5,324,566 | A | | 6/1994 | Ogawa et al. |
| 5,462,586 | A | | 10/1995 | Sugiyama et al. |
| 5,508,092 | A | * | 4/1996 | Kimock ................ B32B 17/06 428/216 |
| 6,183,853 | B1 | * | 2/2001 | Exsted ............... B01D 67/0088 428/308.4 |
| 6,579,342 | B2 | * | 6/2003 | Wang ................. B01D 39/1692 55/524 |
| 8,475,704 | B2 | * | 7/2013 | Zhao ..................... B32B 15/14 264/465 |
| 9,364,796 | B2 | * | 6/2016 | Wunn .................. B01D 67/0086 |
| 10,315,140 | B2 | * | 6/2019 | Hauser .............. B01D 39/1607 |
| 2005/0267241 | A1 | * | 12/2005 | Sugimoto ............. C08F 220/22 524/366 |
| 2009/0071339 | A1 | * | 3/2009 | Suzuki ............... B01D 39/1692 96/4 |
| 2010/0032368 | A1 | * | 2/2010 | Nagai ................ B01D 67/0034 210/506 |
| 2010/0269464 | A1 | * | 10/2010 | Mori .................. B01D 39/1692 55/486 |
| 2010/0304086 | A1 | * | 12/2010 | Carre ..................... B82Y 20/00 428/149 |
| 2011/0122210 | A1 | * | 5/2011 | Sambhy ............... C09D 183/04 347/101 |
| 2011/0189918 | A1 | * | 8/2011 | Zhao ..................... B32B 15/14 442/378 |
| 2011/0304671 | A1 | * | 12/2011 | Law ...................... B41J 2/1606 347/44 |
| 2012/0154487 | A1 | * | 6/2012 | Sambhy ................ B41J 2/1606 347/45 |
| 2013/0025457 | A1 | | 1/2013 | Furuuchi et al. |
| 2013/0074691 | A1 | * | 3/2013 | Furuyama ............. B01D 46/54 95/45 |
| 2013/0093814 | A1 | * | 4/2013 | Gulvin .................. B41J 2/1433 347/33 |
| 2013/0333978 | A1 | * | 12/2013 | Abe ..................... G10K 11/002 181/291 |
| 2015/0174517 | A1 | * | 6/2015 | Furuyama ............. B01D 46/54 95/285 |
| 2015/0217220 | A1 | | 8/2015 | Ikeyama et al. |
| 2015/0322272 | A1 | * | 11/2015 | Pokroy ................. A01N 29/02 428/141 |
| 2017/0157573 | A1 | * | 6/2017 | Mori ..................... B01D 71/36 |
| 2018/0281103 | A1 | * | 10/2018 | Nanbu ..................... B21B 1/22 |

FOREIGN PATENT DOCUMENTS

| | | |
|---|---|---|
| JP | 7-126428 A | 5/1995 |
| JP | 2002-35558 A | 2/2002 |
| JP | 2008-12418 A | 1/2008 |
| JP | 2008-18679 A | 1/2008 |
| JP | 2008-189705 A | 8/2008 |
| JP | 2010-180971 A | 8/2010 |
| JP | 2011-233518 A | 11/2011 |
| JP | 2014-42878 A | 3/2014 |

OTHER PUBLICATIONS

International Search Report issued with respect to Patent Application No. PCT/JP2016/003453, dated Sep. 27, 2016.
International Preliminary Report on Patentability issued with respect to Patent Application No. PCT/JP2016/003453, dated Jan. 30, 2018.

* cited by examiner

AIR-PERMEABLE FILTER PROVIDED WITH OIL REPELLENCY

TECHNICAL FIELD

The present invention relates to an air-permeable filter provided with oil repellency.

BACKGROUND ART

Vent holes are often provided in housings of various devices, including: automotive electrical components such as headlamps, rear lamps, fog lamps, turn lamps, motors, various pressure sensors, and pressure switches; cameras; video devices; information terminals such as mobile phones; home electric appliances such as electric shavers and electric toothbrushes; ink cartridge members mounted in copying machines; and lamps for outdoor use. The main purpose of the provision of a vent hole in a housing of a device is to establish communication between the inside and outside of the device and thereby prevent the internal pressure of the device from excessively increasing as the temperature inside the housing rises due to operation of the device. Battery cases are provided with a vent hole far the purpose of ejecting a gas generated during battery operation.

An air-permeable filter may be attached to a vent hole of a housing of a device to prevent water, dust or the like from entering the housing through the vent hole. A porous membrane of a polyolefin resin or fluorine resin is generally used as the air-permeable filter. In particular, a porous membrane produced by stretching of polytetrafluoroethylene (referred to as "Pain" hereinafter) and having a fine porous structure is known to serve as an air-permeable filter exhibiting excellent water repellency and air permeability. Air-permeable filters may have contact with sebum, a surfactant, an oil, or an ink, depending on the environment in which the filters are used. Even with the use of a stretched porous PTFE membrane having excellent water repellency as an air-permeable filter, a liquid with a low surface tension cannot be prevented from penetrating through the air-permeable filter. Thus, air-permeable filters may, depending on their intended use, be subjected to oil-repellent treatment using a treatment agent containing a fluorine-containing polymer.

It is well known that fluorine-containing polymers having a linear perfluoroalkyl group (referred to as "Rf group" hereinafter) are suitable for imparting oil repellency. Fluorine-containing polymers having a Rf group are used as treatment agents for oil-repellent treatment.

It is also known practice to impart oil repellency to an air-permeable filter using a treatment agent as described above in combination with another treatment agent. For example, Patent Literature 1 discloses treating an air-permeable filter with a treatment agent that contains a fluorine-containing polymer having a group and that further contains a fluorine resin having a fluorinated alicyclic structure in the main chain.

CITATION LIST

Patent Literature

Patent Literature 1: JP 7(1995)-126428 A

SUMMARY OF INVENTION

Technical Problem

In automobiles, electrical components are disposed in the vicinity of the engine to meet the demand for minimizing the space occupied by the engine room. In that case, therefore, an oil or oil mist may adhere to an air-permeable filter used in an electrical component. When an air-permeable filter is used in an ink cartridge member mounted in a copying machine, an ink may come into contact with the surface of the air-permeable filter.

A conventional air-permeable filter produced by coating the surface of a stretched porous PTFE membrane with an oil-repellent agent can prevent an oil or ink from penetrating through the air-permeable filter; however, the oil or ink adhering to the surface of the air-permeable filter cannot be removed, and the air-permeable filters is thus clogged and suffers a decrease in air permeability.

It is therefore an object of the present invention to provide an air-permeable filter capable of maintaining excellent air permeation performance without being clogged even in an environment involving exposure to a substance such as an oil, oil mist, or ink.

Solution to Problem

The present invention provides an air-permeable filter including a porous membrane having a surface coated with an oil-repellent agent, the filter being characterized in that a sliding angle of 20 µl of hexadecane or pentadecane on the surface of the filter is 60° or less.

Advantageous Effects of Invention

The present invention can provide an air-permeable filter capable of maintaining excellent air permeation performance without being clogged even in an environment involving exposure to a substance such as an oil, oil mist, or ink.

DESCRIPTION OF EMBODIMENTS

The air-permeable filter according to the present invention includes a porous membrane having a surface coated with an oil-repellent agent, the filter being characterized in that a sliding angle of 20 µl of hexadecane or pentadecane on the surface of the filter is 60° or less.

An example of the porous membrane used in the air-permeable filter according to the present invention is a porous polytetrafluoroethylene membrane (which may be referred to as "porous PTFE membrane" hereinafter) having properties such as chemical resistance, solvent resistance, fouling resistance, and heat resistance which are suitable for a filter medium. The following will describe a porous PTFE membrane; however, the porous membrane used in the invention is not limited to the porous PTFE membrane and may be any porous membrane that can be used as a filter medium. A preferred example of the material of the porous membrane is a polyolefin resin or fluorine resin. A fluorine resin is more preferred, and PTFE is particularly preferred.

A method for producing the porous PTFE membrane will be described hereinafter, although a commercially-available porous PTFE membrane such as "TEMISH (registered trademark)" series (NTF 810A, NTF 820A, NTF 1125, and NTF 1128, for example) manufactured by Nitto Denko Corporation may be used.

(Production of Porous PTFE Membrane)

First, a pasty mixture obtained by adding a liquid lubricant to a fine PTFE powder is preformed to obtain a preformed body (step A). The liquid lubricant is not particularly limited and may be any lubricant that can wet the surface of the fine PTFE powder and can be removed by extraction or drying. Examples of the liquid lubricant include: hydrocarbons such as liquid paraffin, naphtha, white oil, toluene, and xylene; and various alcohols, ketones, esters, and fluorine-based solvents. A mixture of two or more thereof may also be used. The amount of the liquid lubricant used is preferably about 5 to 50 parts by weight with respect to 100 parts by weight of the fine PTFE powder. The preforming may be carried out at a pressure that does not cause the liquid lubricant to be squeezed out. A commercially-available product can be used as the fine PTFE powder. Examples of commercially-available fine PTFE powders include: POLYFLON F-104, F-106, and F-101 HE manufactured by Daikin Industries, Ltd.; Fluon CD-123, CD-1, CD-145, XCD-809, CD-014, and CD-126 manufactured by Asahi Glass Co., Ltd.; and Teflon (registered trademark) 6-J, 65-N, and 601-A manufactured by Du Pont-Mitsui Fluorochemicals Company; Ltd.

The mixing ratio between the fine PTFE powder and the liquid lubricant is not particularly limited. Typically, the amount of the liquid lubricant is about 5 to 35 parts by weight with respect to 1.00 parts by weight of the fine PTFE powder. The amount of the liquid lubricant is preferably controlled to about 20 to 30 parts by weight with respect to 100 parts by weight of the fine PTFE powder to weaken the binding between PTFE particles in the resulting formed body of PTFE.

Next, the preformed body obtained in the preforming step A is formed into a sheet by paste extrusion or rolling to obtain a formed, body of PTFE (step B). For the extrusion forming, an extruder having an extrusion cylinder and an extrusion die connected to the cylinder may be used. The conditions of the extrusion forming are not particularly limited and can be selected as appropriate within ranges known to be commonly employed for sheet forming.

The formed body of PTFE thus obtained is stretched (step C). The stretching can result in the porous PTFE membrane used in the air-permeable filter according to the present invention. The stretching may be uniaxial stretching or biaxial stretching. For example, the formed body of PTFE is subjected to sequential biaxial stretching at a temperature equal to or lower than the melting point of PTFE. In sequential biaxial stretching, stretching in the longitudinal direction (MD) is preferably performed at a temperature equal to or higher than the melting point of PTFE. Stretching in the width direction (TD) is typically performed at 40 to 400° C. To obtain high air permeability and avoid breakage during stretching, the stretching in the width direction is more preferably performed at 100 to 300° C. The stretch ratio in MD is preferably 40 to 200 and more preferably 60 to 160. If the stretch ratio in MD is less than 40, the finally-obtained porous PTFE membrane may have short fibrils and hence a small average pore diameter, which makes it difficult to achieve high air permeability. If the stretch ratio in MD is excessively high, namely more than 200, the sheet-shaped formed body is broken, and the porous PTFE membrane cannot be obtained. The stretch ratio in TD is preferably 3 to 40. The stretching can be performed using a known stretching apparatus. The stretching of the formed body of PTFE is preferably performed after the liquid lubricant is removed by a technique such as heating or extraction.

The stretching in the longitudinal direction and the stretching in the width direction may be performed in several steps, although it is preferable to minimize the number of steps from the industrial point of view. The first stretching is preferably stretching in the longitudinal direction; however, for the subsequent stretching steps, the order and combination of stretching in the longitudinal direction and stretching in the width direction are not particularly limited.

The steps described above result in a porous PTFE membrane.

The porous membrane (preferably a porous PTFE membrane) used in the present invention typically has a distinctive fine porous structure composed of fibrils and nodes (granular clumps) and exhibits excellent liquid repellency by itself. The porous membrane used in the present invention may be a sintered porous membrane resulting from sintering at a temperature equal to or higher than the inciting point of PTFE or may be an unsintered porous membrane not subjected to such sintering.

The average pore diameter of the porous membrane is preferably, but not limited to, 0.005 to 10 μm, more preferably 0.01 to 5 μm, and even more preferably 0.1 to 3 μm. If the average pore diameter is excessively small, the air permeability of the air-permeable filter may be reduced. If the average pore diameter is excessively large, leakage of foreign matter may occur. The "average pore diameter" can be measured according to ASTM (American Society for Testing and Materials) F316-86. The measurement can be conducted, for example, using a commercially-available measurement apparatus (such as Perm-Porometer manufactured by Porous Materials Inc.) capable of automatic measurement specified in the ASTM standard. The thickness of the porous membrane is preferably 5 to 5000 μm, more preferably 10 to 1000 μm, and particularly preferably 10 to 500 μm. If the membrane is excessively thin, the membrane may lack sufficient strength, and the air-permeable filter may be considerably deformed due to a differential pressure between the inside and outside of the housing to be ventilated. If the membrane is excessively thick, the air permeability of the air-permeable filter may be reduced.

The porosity of the porous membrane is not particularly limited. To maintain good air permeability even in an environment involving contact with an oil or pentadecane, the porous membrane preferably has a porosity of 65 to 95% and more preferably has a porosity of 70 to 90%. The porosity of the porous membrane, as described herein, is calculated by determining the bulk density of the porous membrane from its volume and weight and using the the following formula on the assumption that the true density of the PTFE resin is 2.28 g/cm$^3$: {1 (weight [g]/(thickness [cm]×area [cm$^2$]×true density [2.28 g/cm$^3$]))}×100(%).

The air-permeable filter according to the present invention can be produced by a production method including a step D of subjecting at least one surface of the porous membrane to surface-roughening treatment and a step E of subjecting a surface region including at least the roughened surface to oil-repellent treatment. It is important, in this production method, to perform the oil-repellent treatment step E after the surface-roughening treatment step D.)

(Surface-Roughening Treatment Step D)

A surface of the porous membrane is subjected to surface-roughening treatment. The surface-roughening treatment is not particularly limited and may be any treatment by which asperities can be formed on the surface of the porous membrane. The asperity height is preferably 0.5 μm or more and more preferably more than 1.0 μm. The upper limit of the asperity height is not particularly defined, and the asperity height may be less than 2.0 μm. The "asperity height" refers to the distance (elevation) from the bottom of the valleys between the asperities to the top of the peaks of the asperities. The asperity height can be measured with a SEM (such as JSM-6510 LV manufactured by JEOL Ltd.). Examples of surface-roughening techniques that can be used include sputter etching treatment, ion beam treatment, laser etching treatment, sandblasting treatment, and treatment with sandpaper. Among them, sputter etching treatment and ion beam treatment are preferred since these treatments can form asperities in the shape of a sharp cone.

Among the surface-roughening treatment techniques mentioned above, the sputter etching treatment is typically a technique in which one surface of the object to be treated is bombarded with gas-derived energy particles to cause release of molecules or atoms from the one surface of the object. Specifically, the porous membrane is placed in a chamber first, then a reduced-pressure atmosphere is created in the chamber, and thereafter a high-frequency voltage is applied in conjunction with introduction of atmospheric gas into the chamber to etch the surface of the porous membrane.

Examples of the atmospheric gas used in the sputter etching include: noble gases such as helium, neon, and argon; nitrogen; and oxygen. Among them, argon and oxygen, which are easily available, are preferably used. Oxygen is particularly preferred to achieve high etching efficiency and ensure higher retention of air permeability after contact with an oil.

The frequency of the high-frequency voltage in the sputter etching is, for example, 1 to 100 MHz and preferably 5 to 50 MHz. The pressure inside the chamber is, for example, but not limited to, 0.05 to 200 Pa and is preferably 0.5 to 100 Pa.

The energy amount (a product of the electric power per unit area and the process time) in the sputter etching is preferably 1 to 1000 J/cm$^2$, To ensure higher retention of air permeability after contact with an oil, the energy amount is more preferably 31 to 500 J/cm$^2$, even more preferably 40 to 400 J/cm$^2$, particularly preferably 50 to 300 J/cm$^2$, and most preferably 55 to 200 J/cm$^2$.

(Oil-Repellent treatment Step E)

Next, the surface-roughened porous membrane is subjected to oil-repellent treatment. Specifically, an oil-repellent treatment agent solution is applied and dried on the porous membrane. Examples of techniques that can be used for application of the oil-repellent treatment agent include, but are not limited to, spraying, spin coating, dipping, and roll coating. When, for example, the application is performed by dipping, the conditions under which the porous membrane is immersed in the oil-repellent treatment agent solution are not particularly limited as long as the effect of the present invention is obtained. The immersion temperature is preferably, but not limited to, about 5 to 35° C. The immersion time is preferably, but not limited to, about 2 to 60 seconds.

The concentration of the oil-repellent treatment agent in the oil-repellent treatment agent solution is preferably 0.1 to 10 wt % and more preferably 0.5 to 5.0 wt %.

The oil-repellent treatment agent is preferably, but not limited to, a fluorine-based oil-repellent treatment agent. The fluorine-based oil-repellent treatment agent is preferably, for example, at least one selected from the group consisting of an acrylic polymer having a fluorine-containing side chain, a urethane polymer having a fluorine-containing side chain, and a silicone polymer having a fluorine-containing side chain. A commercially-available product can be used as the fluorine-based oil-repellent treatment agent. Examples of commercially-available products that may be used include: "UNIDYNE (registered trademark)" series manufactured by Daikin Industries, Ltd.; X-70-029C and X-70-043 manufactured by Shin-Etsu Chemical Co., Ltd.; and "SFCOAT (registered trademark)" series (such as SIF-200) manufactured by AGC Seimi. Chemical Co., Ltd. An example of the silicone polymer serving as the fluorine-based oil-repellent treatment agent is KP-801M manufactured by Shin-Etsu Chemical Co., Ltd.

The solvent used in the oil-repellent treatment agent solution is preferably a fluorine-based solvent having high affinity to fluorinated side chains. A commercially-available product can be used as the fluorine-based solvent having high affinity to the fluorinated side chain. Examples of the commercially-available product include FS Thinner manufactured by Shin-Etsu Chemical Co., Ltd. and Fluorinert manufactured by Sumitomo 3M Ltd. One of these may be used alone, or a mixture of two or more thereof may be used.

The drying of the oil-repellent treatment agent solution applied is not particularly limited and may be natural drying (air drying). To ensure excellent retention of air permeability after contact with an oil, heat drying at 40 to 120° C. is preferred, and heat drying at 50 to 110° C. is more preferred.

The oil-repellent treatment is preferably performed over the entire air-permeable filter, and may be performed only on one surface subjected to the surface-roughening treatment.

The air-permeable filter according to the present invention includes a porous membrane having a surface coated with an oil-repellent agent (an oil-repellent agent-coated surface) and may include a laminate of the porous membrane and an air-permeable supporting member for reinforcing the porous membrane. The use of the air-permeable supporting member can reduce the differential pressure-induced deformation of the air-permeable filter. The air-permeable supporting member may consist of a single layer or may be a laminate of two or more layers. It should be noted that, to exhibit oil repellency, the air-permeable filter has at least one principal surface formed by the oil-repellent agent-coated surface of the porous membrane.

The air-permeable supporting member used can be, for example, a porous ultrahigh-molecular-weight polyethylene membrane, non-woven fabric, woven fabric, net, mesh, sponge, foam, porous metal membrane, or metal mesh. In view of strength, elasticity, air permeability, workability, and weldability to containers, a non-woven fabric or porous ultrahigh-molecular-weight polyethylene membrane is preferred as the air-permeable supporting member.

The porous membrane and the air-permeable supporting member may be merely overlaid on each other, may be bonded together via an adhesive layer made of an adhesive or hot-melt resin, or may be welded together by heat welding, ultrasonic welding, or vibration welding.

For the air-permeable filter according to the present invention which includes a porous membrane having a surface coated with an oil-repellent agent, a sliding angle of 20 μl of hexadecane or pentadecane on the surface of the filter is 60° or less and preferably less than 55°. The method for measuring the sliding angle is as described later in EXAMPLES.

To achieve excellent air permeability, the air-permeable filter of the present invention is preferably designed so that nodes of the porous membrane have a diameter of 2.0 μm or more. To achieve excellent air permeability; the air-permeable filter of the present invention is preferably designed so that the nodes of the porous membrane are spaced at a distance of 1.0 μm or more. The diameter of the nodes and the distance between the nodes can be measured, for example, with a SEM (such as JSM-6510 LV manufactured by JEOL Ltd.).

The air-permeable filter according to the present invention is preferably designed so that an air permeability value, as measured according to JIS P 8117: 2009 (Gurley method) after an automotive ATF oil or pentadecane is placed on the air-permeable filter as described later in EXAMPLES, is 65.0 seconds/100 cc or less, more preferably 45.0 seconds/100 cc or less, and even more preferably 30.0 seconds/100 cc or less. The air-permeable filter according to the present invention is preferably designed so that an air permeability value, as measured according to JIS P 8117: 2009 (Gurley method) after an ATF oil or pentadecane is placed on the surface of the air-permeable filter and the air-permeable filter is kept inclined at 90° for 1 minute to allow the ATF oil or pentadecane to fall freely as described later in EXAMPLES, is less than 400%, more preferably less than 300%, and even more preferably less than 100%, of an air permeability value as measured before the placement of the ATF oil or pentadecane.

The present invention encompasses embodiments obtainable by combining the above features in various ways within the technical scope of the present invention as long as the effect of the present invention is obtained.

EXAMPLES

Next, the present invention will be described in more detail with Examples. The present invention is by no means limited to Examples presented below and can be variously modified by persons ordinarily skilled in the art within the scope of the technical idea of the present invention.

Example 1

A porous fluorine resin film manufactured by Nitto Denko Corporation, "TEMISH (registered trademark) NTF 810A" (having a thickness of 310 μm, an average pore diameter of 0.5 μm, and a porosity of 76%), was adopted as the porous PTFE membrane. The porous PTFE membrane was subjected to the surface-roughening treatment step D, in which the membrane was sputter-etched with an energy amount of 75 J/cm$^2$ using oxygen gas as atmospheric gas. X-70-043 manufactured by Shin-Etsu Chemical Co., Ltd. was adopted as the oil-repellent treatment agent and diluted with FS Thinner manufactured by Shin-Etsu Chemical Co., Ltd. to a concentration of 3.0 wt %. An oil-repellent treatment agent solution was thus prepared. The porous PTFE membrane subjected to the surface-roughening treatment was immersed in the oil-repellent treatment agent solution for about 3 seconds, slowly withdrawn from the solution, and left to dry at room temperature (oil-repellent treatment step E). The resulting porous PTFE membrane having a surface coated with the oil-repellent agent was tested as an air-permeable filter.

Example 2

A porous PTFE membrane was obtained in the same manner as in Example 1, except for changing the energy amount in the sputter etching treatment to 50 J/cm$^2$. This porous PTFE membrane was tested as an air-permeable filter.

Example 3

A porous PTFE membrane was obtained in the same manner as in Example 1, except for changing the energy amount in the sputter etching treatment to 25 J/cm$^2$. This porous PTFE membrane was tested as an air-permeable filter.

Comparative Example 1

A porous fluorine resin film manufactured by Nitto Denko Corporation, "TEMISH (registered trademark) NTF 810A" (having a thickness of 310 μm, an average pore diameter of 0.5 μm, and a porosity of 76%), was adopted as the porous PTFE membrane. This porous PTFE membrane itself was tested as a non-oil-repellent air-permeable filter without being subjected to the surface-roughening treatment and oil-repellent treatment.

Comparative Example 2

A porous PTFE membrane was obtained in the same manner as in Example 1, except for performing the oil-repellent treatment without carrying out the sputter etching treatment, namely the surface-roughening treatment. This porous PTFE membrane was tested as an air-permeable filter.

Comparative Example 3

A porous PTFE membrane was obtained in the same manner as in Example 1, except for performing the surface-roughening treatment with an energy amount of 75 J/cm$^2$ and omitting the oil-repellent treatment. This porous PTFE membrane was tested as an air-permeable filter.

Example 4

A porous PTFE membrane was obtained in the same manner as in Example 1, except for changing the energy amount in the sputter etching treatment to 200 J/cm$^2$. This porous PTFE membrane was tested as an air-permeable filter.

Comparative Example 4

A porous PTFE membrane was obtained in the same manner as in Example 1, except for performing the surface-roughening treatment with an energy amount of 200 J/cm$^2$ and omitting the oil-repellent treatment. This porous PTFE membrane was tested as an air-permeable filter.

[Tests]

The air-permeable filters according to Examples 1 to 4 and Comparative Examples 1 to 4 which were obtained as described above were subjected to sliding angle measurement and air permeability value measurement.

The air permeability value measurement was conducted according to JIS P 8117: 2009 (Gurley method). First, the air permeability value of the air-permeable filter as obtained was measured. Next, an automotive ATF oil (manufactured by Mobil Corporation under the trade name "ATF 220") or pentadecane with a surface tension comparable to that of inks for copying machines was placed on a surface of the air-permeable filter (in Examples 1 to 4 and Comparative Examples 3 and 4, the surface subjected to the surface-roughening treatment), and the air-permeable filter was kept inclined at 90° for 1 minute to allow the ATF oil or pentadecane to fall freely. After that, the air permeability value was measured again.

The sliding angle measurement was conducted using a contact angle measurement apparatus (Contact Angle System OCA 20 manufactured by DataPhysics Instruments GmbH). A drop of 20 μl of hexadecane or pentadecane was placed on a surface of the air-permeable filter (in Examples 1 to 4 and Comparative Examples 3 and 4, the surface subjected to the surface-roughening treatment), and the air-permeable filter was progressively inclined. The inclination angle at which the drop of hexadecane or pentadecane began to slide down was measured.

Figure 1:
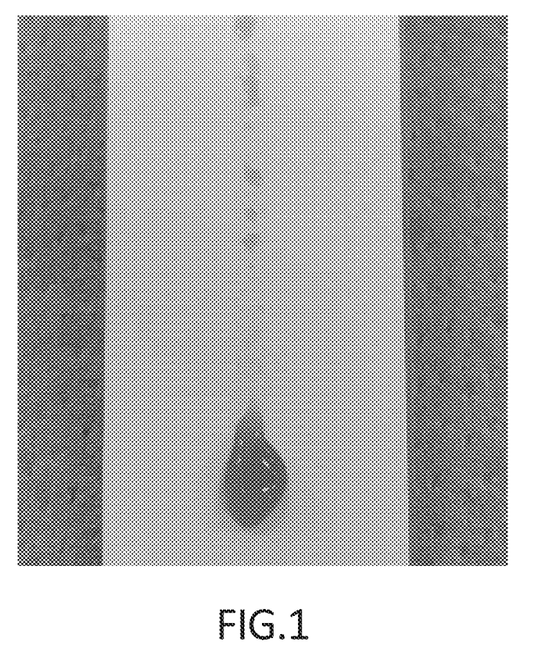
FIG. 1 is a photograph of an ATF oil sliding down on an air-permeable filter of Example 1.
Figure 2:
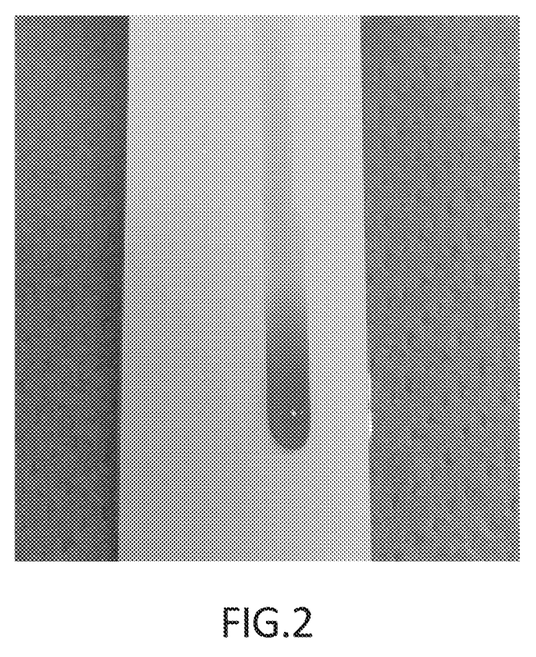
FIG. 2 is a photograph of an ATF oil sliding down on an air-permeable filter of Comparative Example 2.
Figure 3:
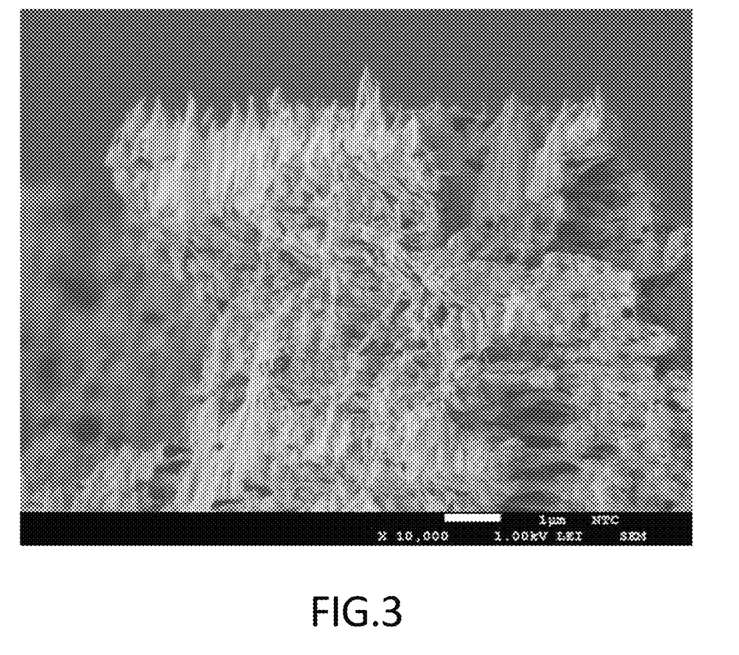
FIG. 3 is a scanning electron microscope (SEM) image (at a magnification of 10000) of the surface of a porous PTFE membrane subjected to surface-roughening treatment in Example 1.
Figure 4:
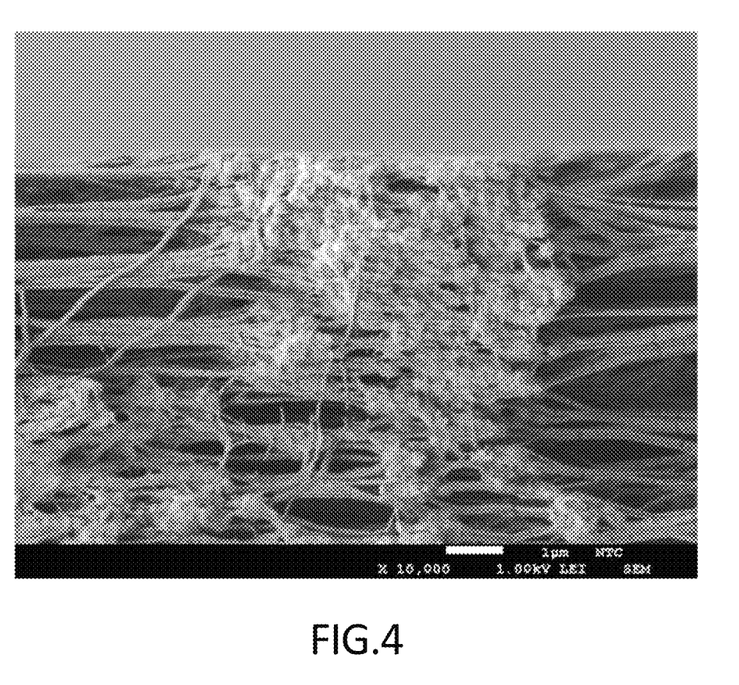
FIG. 4 is a SEM image (at a magnification of 10000) of the surface of a porous PUT membrane subjected to surface-roughening treatment in Comparative Example 1.
Figure 5:
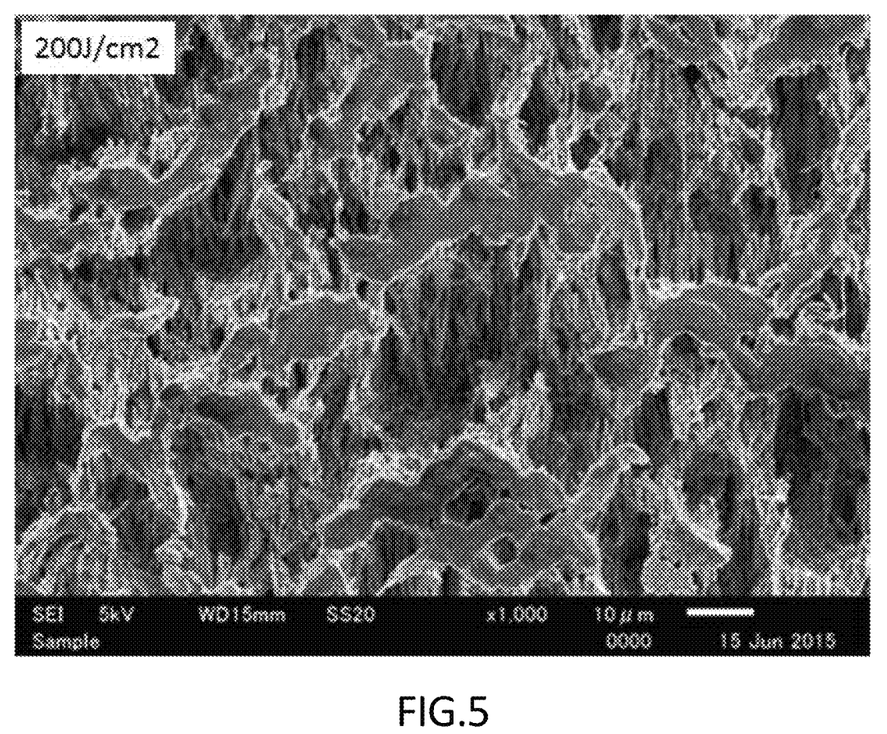
FIG. 5 is a SEM image (at a magnification of 1000) of the surface of a porous PTFE membrane subjected to surface-roughening, treatment in Example 4.

The results of the above tests are shown in Tables 1 and 2 below. A photograph of an ATE oil falling freely on the air-permeable filter of Example 1 is shown in FIG. 1, and a photograph of an ATF oil falling freely on the air-permeable filter of Comparative Example 2 is shown in FIG. 2. Images obtained by observing the surfaces of the surface-roughened porous PTFE membranes of Example 1, Comparative Example 1, and Example 4 with a SEM (JSM-6510 LV manufactured by JEOL Ltd.) at a magnification of 10000 are shown in FIG. 3, FIG. 4, and FIG. 5, respectively.

TABLE 1

| Sample | | | Air permeability value (seconds/100 cc) | | |
|---|---|---|---|---|---|
| | Energy amount in sputter etching treatment (J/cm$^2$) | Oil-repellent treatment | Sliding angle of hexadecane (°) | Before placement of oil | After placement of oil |
| Example 1 | 75 | Performed | 53 | 15.7 | 20.2 |
| Example 2 | 50 | Performed | 53 | 15.4 | 35.7 |
| Example 3 | 25 | Performed | 55 | 16.6 | 63.8 |
| Comparative Example 1 | Not applicable | Not performed | Penetrated | 13.5 | >70.0 |
| Comparative Example 2 | Not applicable | Performed | 65 | 14.5 | >70.0 |
| Comparative Example 3 | 75 | Not performed | Penetrated | 14.3 | >70.0 |

TABLE 2

| Sample | | | Air permeability value (seconds/100 cc) | | |
|---|---|---|---|---|---|
| | Energy amount in sputter etching treatment (J/cm$^2$) | Oil-repellent treatment | Sliding angle of pentadecane (°) | Before placement of pentadecane | After placement of pentadecane |
| Example 4 | 200 | Performed | 47 | 7.1 | 10.2 |
| Example 3 | 25 | Performed | 59 | 16.2 | 32.1 |
| Comparative Example 1 | Not applicable | Not performed | Penetrated | 13.3 | >70.0 |
| Comparative Example 2 | Not applicable | Performed | 75 | 14.5 | >70.0 |
| Comparative Example 4 | 200 | Not performed | Penetrated | 6.8 | >70.0 |

For the air-permeable filters of Examples 1 to 4 which were obtained by subjecting a porous PTFE membrane to surface-roughening treatment and oil-repellent treatment, the sliding angle of hexadecane or pentadecane was 60° or less, and the deterioration in air permeability value after the placement of an oil or pentadecane was small. This demonstrated that the air-permeable filters of Examples 1 to 4 are capable of maintaining good air permeability without being clogged even in an environment involving contact with an oil or a liquid with a surface tension comparable to that of inks. By contrast, the air-permeable filters of Comparative Examples 1, 3, and 4 which were not subjected to oil-repellent treatment were penetrated by hexadecane or pentadecane, and as for the air-permeable filters of Comparative Examples 1 and 2 which were not subjected to surface-roughening treatment, the sliding angle of hexadecane or pentadecane was more than 60°. These air-permeable filters of Comparative Examples 1 to 4 showed a significant deterioration in air permeability value after the placement of an oil or pentadecane and failed to maintain air permeability. Additionally, it was confirmed from the photograph of FIG. 3 that asperities were formed on the surface of the porous PTFE membrane as a result of surface-roughening treatment and that the asperity height was approximately 1.5 μm. It was also confirmed from the photograph of FIG. 4 that the surface of the porous PTFE membrane of Comparative Example 1 which was not subjected to surface-roughening treatment was smooth and devoid of asperities.

INDUSTRIAL APPLICABILITY

The air-permeable filter according to the present invention is capable of maintaining excellent air permeation performance even in an environment involving exposure to a substance such as an oil, oil mist, or ink. The air-permeable filter according to the present invention is therefore applicable, for example, as an air-permeable filter for use in automotive electrical components that is required to exhibit excellent retention of air permeability even in an environment involving exposure to an oil or oil mist or as an air-permeable filter for use in copying machines that is required to exhibit excellent retention of air permeability even in an environment involving contact with an ink.

The invention claimed is:

1. An air-permeable filter comprising a porous membrane having a surface coated with an oil-repellent agent, wherein a sliding angle of 20 μl of hexadecane or pentadecane on the surface of the filter is 60° or less, wherein nodes included in the porous membrane have a diameter of 2.0 μm or more.

2. The air-permeable filter according to claim 1, wherein the porous membrane is a porous polytetrafluoroethylene membrane.

3. The air-permeable filter according to claim 1, wherein an air permeability value, as measured according to JIS P 8117: 2009 (Gurley method) after an ATF oil or pentadecane is placed on the surface of the air-permeable filter and the air-permeable filter is kept inclined at 90° for 1 minute to allow the ATF oil or pentadecane to fall freely, is less than 400% of an air permeability value as measured before the placement of the ATF oil or pentadecane.

4. The air-permeable filter according to claim 1, having a porosity of 70 to 90%.

5. The air-permeable filter according to claim 1, wherein nodes included in the porous membrane are spaced at a distance of 1.0 µm or more.

6. The air-permeable filter according to claim 1, wherein the porous membrane has at least one surface with asperities having a height of 0.5 µm or more, and the surface with the asperities is coated with the oil-repellent agent.

* * * * *